US012050892B2

(12) United States Patent
Isner (10) Patent No.: US 12,050,892 B2
(45) Date of Patent: Jul. 30, 2024

(54) CARD SOLVER COMPILER PARSING

(71) Applicant: ROW64, INC., Cheyenne, WY (US)

(72) Inventor: Michael Isner, Dillon, CO (US)

(73) Assignee: ROW64, INC., Dillon, CO (US)

( * ) Notice: Subject to any disclaimer, the term of this patent is extended or adjusted under 35 U.S.C. 154(b) by 86 days.

(21) Appl. No.: 17/934,482

(22) Filed: Sep. 22, 2022

(65) Prior Publication Data

US 2023/0119443 A1 Apr. 20, 2023

Related U.S. Application Data

(60) Provisional application No. 63/247,105, filed on Sep. 22, 2021.

(51) Int. Cl.
*G06F 8/41* (2018.01)
(52) U.S. Cl.
CPC .............. *G06F 8/427* (2013.01); *G06F 8/425* (2013.01)
(58) Field of Classification Search
CPC ................................................. G06F 8/41–427
USPC .................................................. 717/140–144
See application file for complete search history.

(56) References Cited

U.S. PATENT DOCUMENTS

2008/0028377 A1* 1/2008 Dembo ................. G06F 9/4484
712/E9.082

FOREIGN PATENT DOCUMENTS

WO WO-2017178476 A1 * 10/2017 ........... G06F 16/212
WO WO-2021160242 A1 * 8/2021 ............... G06F 8/41

OTHER PUBLICATIONS

Parsing, Wikipedia, 2020, 12 pages, [retrieved on Apr. 11, 2024], Retrieved from the Internet: <URL:https://web.archive.org/web/20200827221040/https://en.wikipedia.org/wiki/Parsing>.*
Lexical Analysis, Wikipedia, 2020, 10 pages, [retrieved on Apr. 11, 2024], Retrieved from the Internet: <URL:https://web.archive.org/web/20201024102527/https://en.wikipedia.org/wiki/Lexical_analysis>.*

* cited by examiner

*Primary Examiner* — Geoffrey R St Leger
(74) *Attorney, Agent, or Firm* — Morrison & Foerster LLP (57) ABSTRACT

Disclosed herein is a compiler parsing technique that makes use of a "card game" mechanic to parse through tokens and generate an output that is inserted into a tree data structure and processed bottom-up. The technique is a non-recursive a parser & lexer. The processing is less computationally expensive than prior, recursive methods such as top down operator precedence. Simpler embodiments employ card solving of simple formulas, and more advanced embodiments implement tree processing structures that implement a card solver parsing technique at each node (or a subset of nodes) of the tree processing structures. In some embodiments, different nodes of a tree processing structure are routed to different processors (e.g., a CPU or a GPU) based on the degree of parallelism available in each node in order to improve parsing, compute, evaluation and compiling times.

19 Claims, 7 Drawing Sheets

FIG. 1

```
------------------ OUTPUT ----------------
V: 3 1 2 * 4 * + 5 +
T: 4 4 4 1 4 1 1 4 1
P: 6 3 3 5 5 6 8 8 -1
C: {{}{}{}{1,2}{}{3,4}{0,5}{}{6,7}}
------------------ SUMMARY --------------
[0] Node: 3 - p: 6, c: ,      cast: 4
[1] Node: 1 - p: 3, c: ,      cast: 4
[2] Node: 2 - p: 3, c: ,      cast: 4
[3] Node: * - p: 5, c: 1, 2,  cast: 1
[4] Node: 4 - p: 5, c: ,      cast: 4
[5] Node: * - p: 6, c: 3, 4,  cast: 1
[6] Node: + - p: 8, c: 0, 5,  cast: 1
[7] Node: 5 - p: 8, c: ,      cast: 4
[8] Node: + - p: -1, c: 6, 7, cast: 1
```

CARD SOLVER COMPILER PARSING

CROSS-REFERENCE TO RELATED APPLICATIONS

The present application claims priority to U.S. Provisional Application No. 63/247,105, filed Sept. 22, 2021, the disclosure of which is hereby incorporated by reference in its entirety.

TECHNICAL FIELD

The present application generally relates to processor behavior and more particularly to compiler parsing.

BACKGROUND

Known parsing algorithms are based on recursive-descent parsing. One of the more popular methods is top down operator precedence ("TDOP") discovered by Vaughan Pratt in 1973. TDOP makes use of a few fundamental principles: first, a "binding power" mechanism handles precedence levels; second, a means of implementing different functionality of tokens depending on their position relative to their neighbors—prefix or infix; and third, as opposed to classic recursive-descent, where semantic actions are associated with grammar rules (BNF), TDOP associates them with tokens. While TDOP improves on prior recursive-descent algorithms, TDOP still implements recursive descents that are computationally expensive.

DETAILED DESCRIPTION

The disclosed compiler parsing technique makes use of a "card game" mechanic to parse through tokens and generate an output that is inserted into a tree data structure and processed bottom-up. The technique is a non-recursive spreadsheet formula compiler. The processing is less computationally expensive than prior, recursive methods.

As described herein, the term "card" is also referred to as a "token representation."

Some embodiments employ card solving of simple formulas. Additionally, some embodiments implement tree processing structures that implement a card solver parsing technique at each node (or a subset of nodes) of the tree processing structures. In some embodiments, different nodes of a tree processing structure are routed to different processors (e.g., a CPU or a GPU) based on the degree of parallelism available in each node in order to improve parsing, compute, evaluation and compiling times.

The card solver can parse formulas using assigned precedence values to each potential operator. The card solver may compare a current card to subsequent cards, and the stronger cards may capture the weaker cards in the parse. As cards are captured, they are stored in order of capture in the parse with a parenting stack based on what card captured them. Where a new card does not capture a prior card, it waits until it is subsequently captured by a later card. At the end, such as when the card solver's operations are determined to have completed, all remaining cards are stored in the parse. After completion of the card game, the parse may be built into a tree data structure that can be processed efficiently.

In some embodiments, the tree structure is assembled in larger units. That is, each node of the tree may include sub-trees. The content of each node may be directed to a particular available processor based on the advantages or disadvantages of the processor's architecture and the content of that node. For example, single instruction-multiple data ("SIMD") type nodes may be directed to a GPU because of the efficiency GPUs can achieve on SIMD instruction sets.

Figure 1:
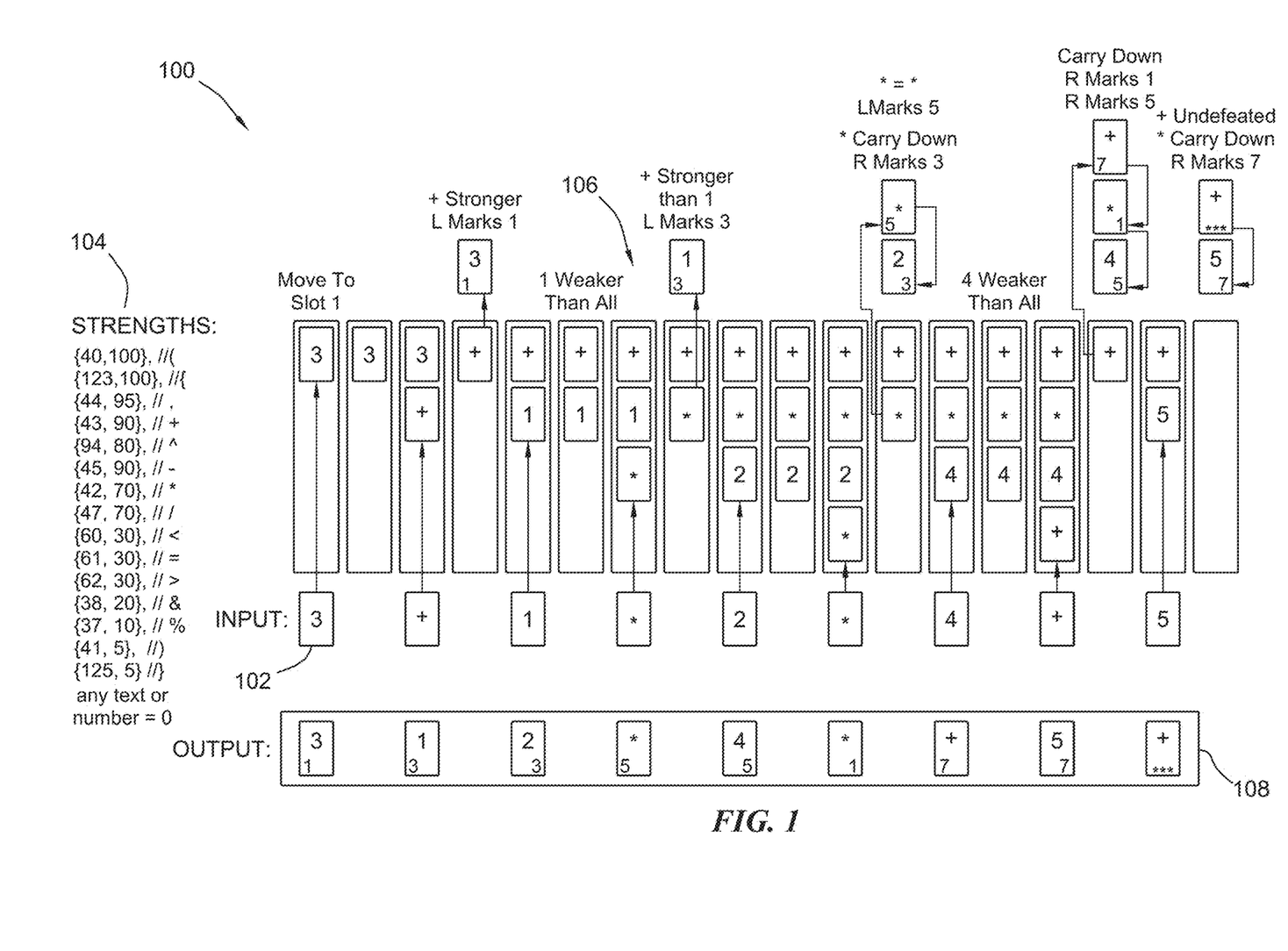
FIG. 1 is an illustration of a card solver game processing method.

FIG. 1 is an illustration of a card solver game processing method. FIG. 1 includes an illustration of a processing example 100. The sample card solver may include a formula input 102, "3+1*2*4+5." This formula input is ultimately what the card solver will operate on. The formula may represent a sequence of tokens (e.g., "3," "+," "1," ... ). Each token of the formula may be converted into a "card." References to "cards" are merely illustrative. A compiler need not actually prepare graphic cards for the purpose of processing a formula. Further, no physical "board" for the "cards" need exist; rather, computationally efficient known data structures are utilized (e.g., an array, stack, list, linked-list, graph, tree, or other known data structure).

Further, each card is assigned a strength 104 or precedence value. The terms precedence value and the strength may be used interchangeably herein. The strengths 104 may indicate that low (zero) precedence values are assigned to text and numbers and higher precedence values are assigned for mathematical operators.

As an example, from the given input 102, the cards may have the following strength values 104:

The numbers 3, 1, 2, 4, and 5 are all given a 0-strength value.

The multiplication symbols are given a 70-strength value.

The addition sign symbols are given a 90-strength value.

The exact strength values are arbitrary and could be assigned differently, but the order of precedence is important with respect to formula processing and is related to order of operations. When new cards are compared against existing cards, cards with matching strength values will win against existing cards.

In some embodiments, starting from left to right in the formula, the first card evaluated is the "3". The "3" token representation may be placed on the board 106. Next, the token representation of the "+" symbol may be placed on the board 106 and compared to the "3." Based on the comparative strength values, the "+" may capture the "3", and the "+" may remain on the board 106, while the "3" is placed into output 108. Then the "1" is placed on the board 106. The token representation of the "1" does not beat the "+", so both remain on the board 106.

Next, the "*" may be placed on the board 106. The "*" captures the "1" but not the "+". The "1" may then be moved to output 108, and the "+" and "*" remain on the board 106. The next card is "2". Like the "1" before it, the "2" does not beat any of the current cards and remains on the board with the "+" and the "*". The next card is a second "*". The second "*" captures the "2" and the first "*", and thus each of these may be moved to output 108. The current board 106 then includes the original "+" and the second "*".

Subsequently, a "4" card may be added (which does not capture anything), and then a second "+". The second "+" captures the entire current board, including the original "+", the second "*", and the "4". Each may be moved to output 108. The final card is a "5". The "5" does not capture the second "+", but since the parser has reached the end of the formula, and therefore the game, the second "+" and the "5" may be added to output 108.

The output 108 now include nine ordered tokens each storing the position of the tokens that each respectively captured. At this stage, the card game is over and has completed efficiently and without recursion.

Figure 2A:
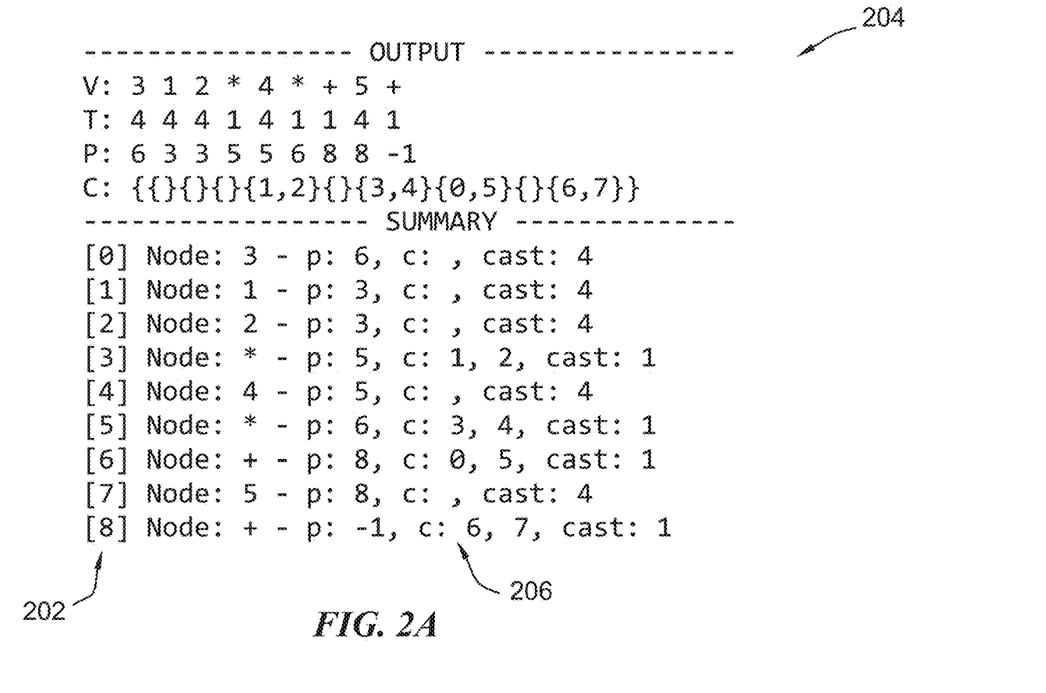
FIGS. 2A-2B are illustrations of an example output of a card solver game processing method.
Figure 2B:
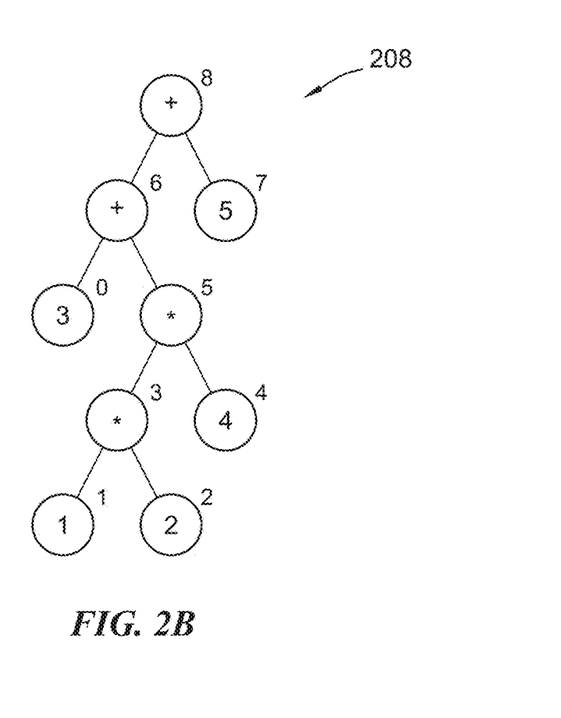

FIGS. 2A-2B is an illustration of an example output of a card solver game processing method. The output drawn from FIG. 1 includes the nine ordered tokens labeled by node numbers 202 across a left side of the representation 204. Further, the tokens include a reference 206 to other tokens they had captured indicated by node numbers. Using the depicted information, a tree data structure 208 (see FIG. 2B) may be built from the top down that can be subsequently processed from the bottom up.

Beginning from the last node—number eight, the second "+" sign—the root of the tree can be formed. Node eight captured nodes six and seven, and thus nodes six and seven may be the leaves of the root node. Node seven captured no other nodes and thus that branch of the tree may end. Node six captured nodes zero and five and thus those node may become leaves of node six. Node zero had no other captured nodes. Node five captured nodes three and four; thus, those respectively can become leaves of node five. Node four captured no nodes. Node three captured nodes one and two; thus, those respectively become leaves of node three.

The tree structure can then processed by an assigned processor from the bottom up.

1*2=2 (result of node three).
2*4=8 (result of node five).
8+3=11 (result of node six).
11+5=16 (result of node eight).

The output of the card game mechanism enabled creation of the tree data structure in a mathematically sound manner that is also computationally efficient. The card solver can perform both lexing and parsing together, performs no recursion, and can be run on a GPU.

Figure 3:
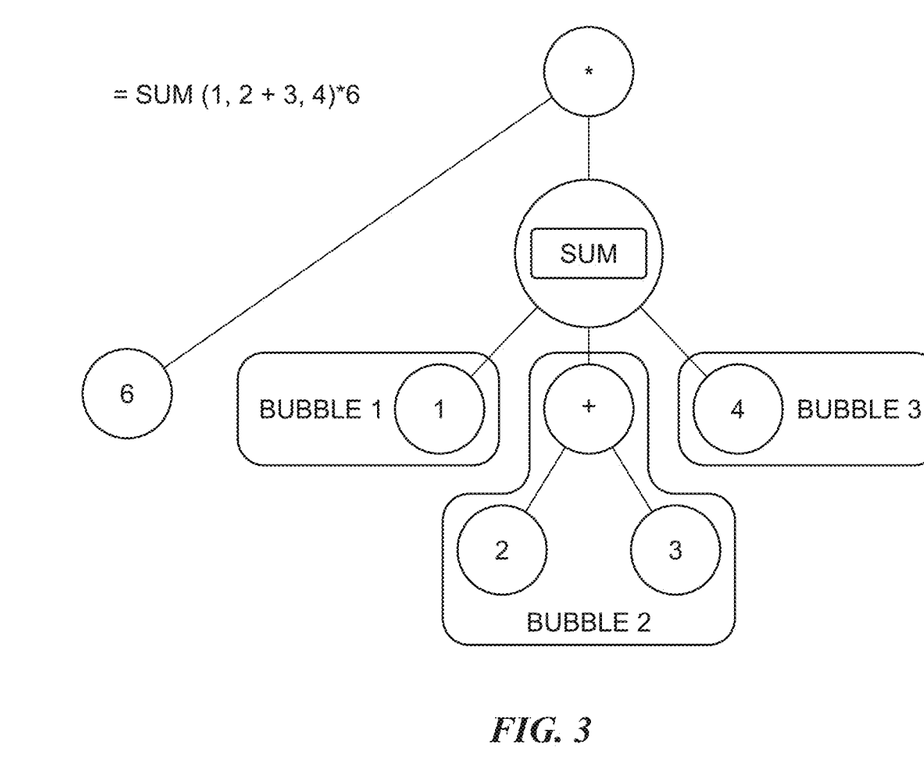
FIG. 3 is an example of a card solver using a formula with parentheses.

FIG. 3 is an example of a card solver using a formula with parentheses. In some embodiments, the card solver mechanism may operate somewhat differently when the parse encounters parentheses, brackets, or commas. In some embodiments, when the parser encounters such operators, it performs multiple layers of card games. However, the additional card games can be performed in parallel and need not be nested (as a recursive operation might be).

Given the example formula SUM(1,2+3,4)*6, as seen in FIG. 3, each parenthesis and comma may indicate a separate card game. In this given example, the number of cards in each parallel game is relatively few. For instance, there are three sub-games in this example, a first including only the card "1"; a second including "2", "3," and "+"; and a third including only the card "4". The main game includes only cards for "6", "*", and the content of the parentheses (which includes a sum operator). Because the SUM function is related to the parentheses, its strength value is that of the result, which is a number, and therefore equals zero.

Figure 4:
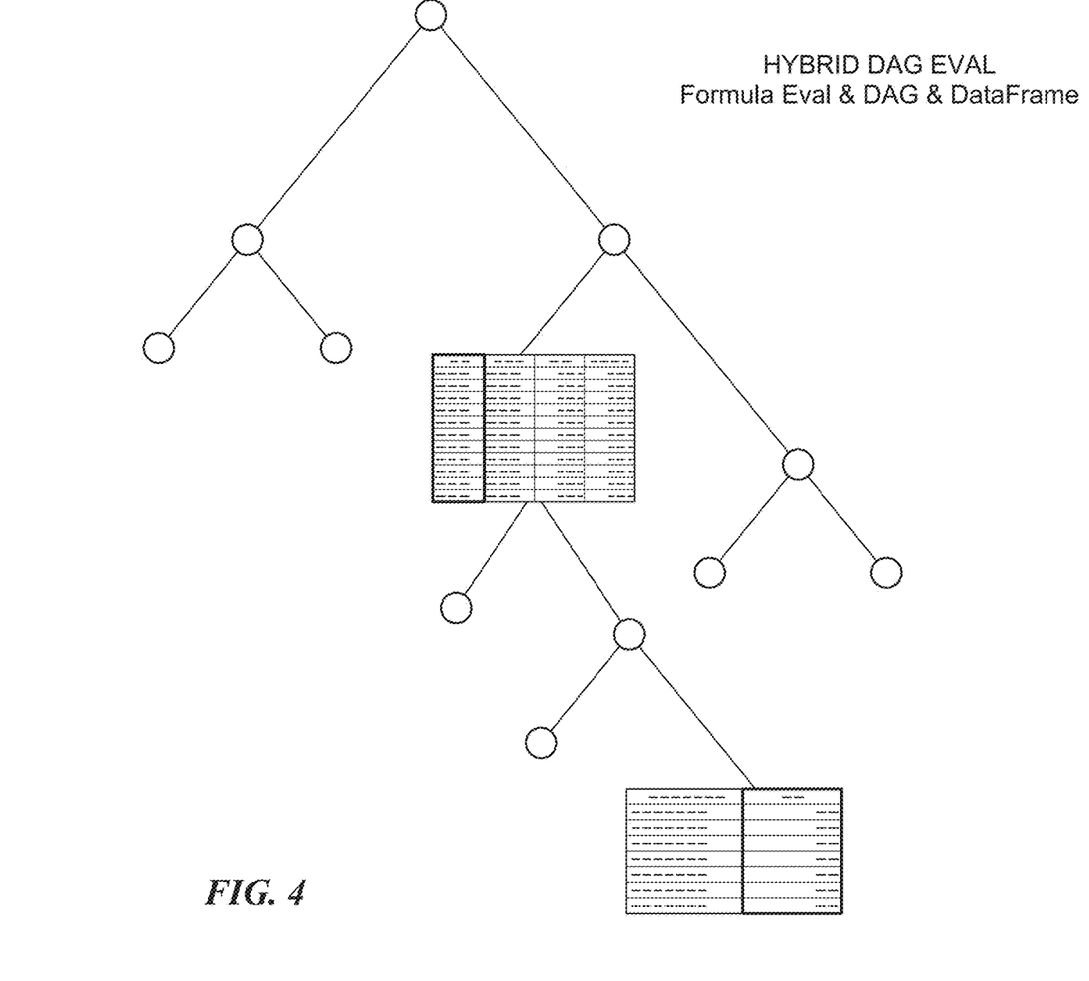
FIG. 4 is an illustration of a card solver game process with hybrid node evaluation where each node represents outputs from another card solver or other evaluation process that are used as inputs by the node parent.

FIG. 4 is a representation of a hybrid tree data structure for parsing formulas. In the depicted example, some of the nodes are SIMD or linear operations. A prior example of SIMD nodes is the SUM node depicted in FIG. 3. Depicted in FIG. 4 are nodes including tables with large lists of numbers to add together. The depicted tree may be referred to as a hybrid in the sense that some nodes may be processed by different processing architectures. For example, the SIMD nodes can be directed to a GPU-type architecture that is very efficient for performing SIMD operations. By directing some nodes to a GPU rather than a CPU, the parser can obtain further processing efficiencies.

Figure 5:
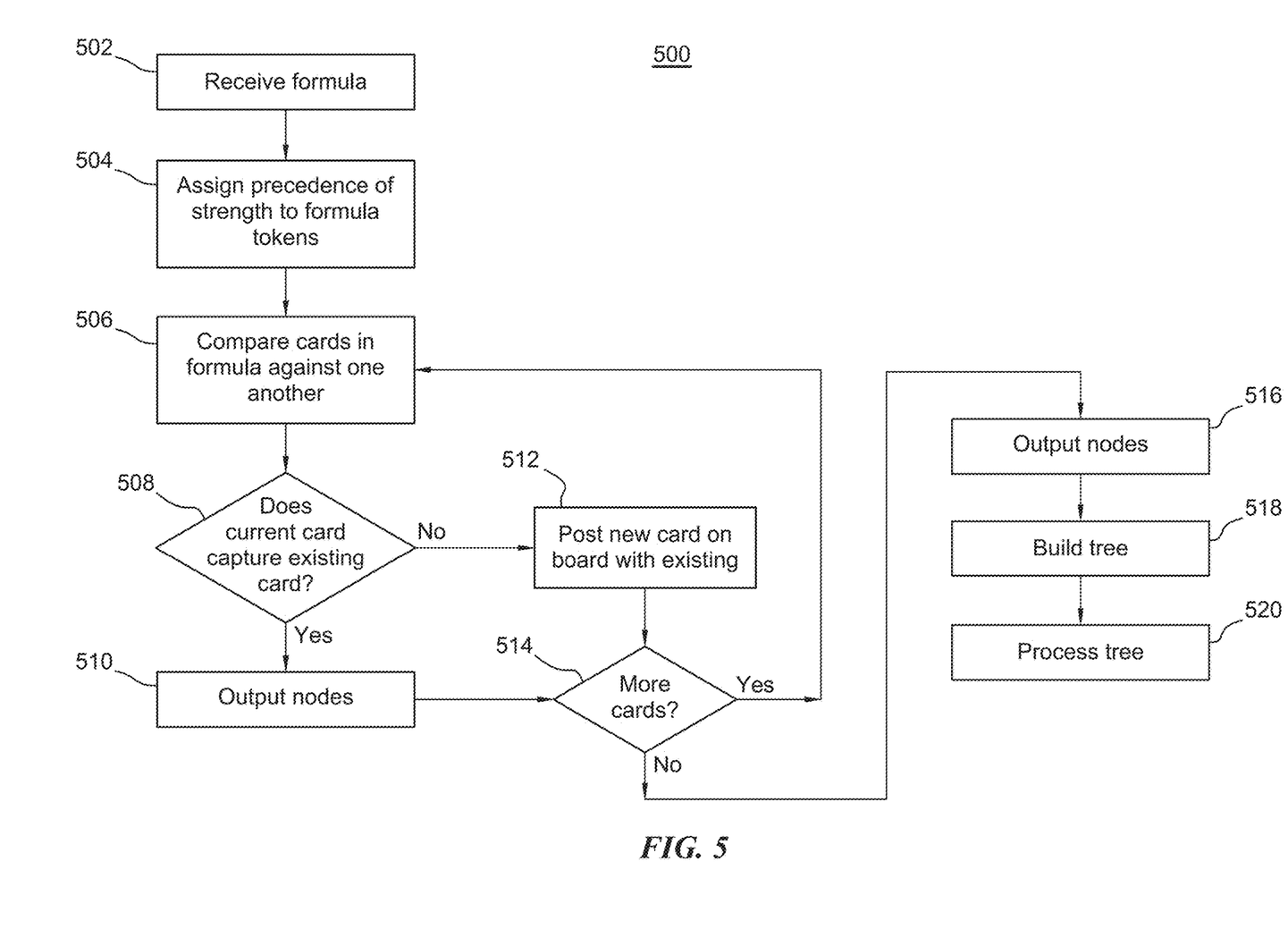
FIG. 5 is a flowchart illustrating card solver compiler procedure.

FIG. 5 is a flowchart illustrating a card solver procedure 500. In step 502, a compiler parser may receive a formula, or multiple formulas. The formulas may range from a single token to many tokens including many different operators. In step 504, the tokens from the formula may be assigned strength or precedence values based on a predetermined table.

In step 506, the tokens may be compared against each other in a card game format. In the card game, new cards may be presented against cards existing in the game. Stronger cards may capture equivalent or weaker cards. The game can obtain the next available card from the formula going left to right. An exception to this process is when the game encounters a parenthesis. In such a circumstance, a new game may be started for the cards within the parentheses.

In step 508, the current card can be compared to the cards currently on the board. If no cards are on the board, nothing may be captured, and the result is an automatic "no" with respect to capturing cards. When cards are on the board, and a card is captured, the method may advance to step 510. In step 510, the captured cards can be output as nodes. The nodes may also include a reference to the card that captured them.

In some embodiments, where no cards are captured, the method (e.g., procedure 500) may advance to step 512. In step 512, the current card may be posted to the board. In step 514, the game may determine whether the formula includes additional cards. If there are additional cards, the method can loop back to step 506 to obtain the next available card. If there are no additional cards, the method may proceed to step 516. In step 516, the cards remaining on the board may be output as nodes with the card remaining on the board the longest obtaining the highest node value.

In step 518, the system may build a tree data structure from the nodes from the top down where captured nodes become leaf nodes of upper nodes. In step 520, a processor may execute the result of the tree from the bottom up. In some cases, sub-trees exist in the tree. These are solved as encountered. In some cases, the processor architecture utilized to process particular tree nodes is selected based on the content of those nodes and based on the architectural advantages of the given processor.

Figure 6:
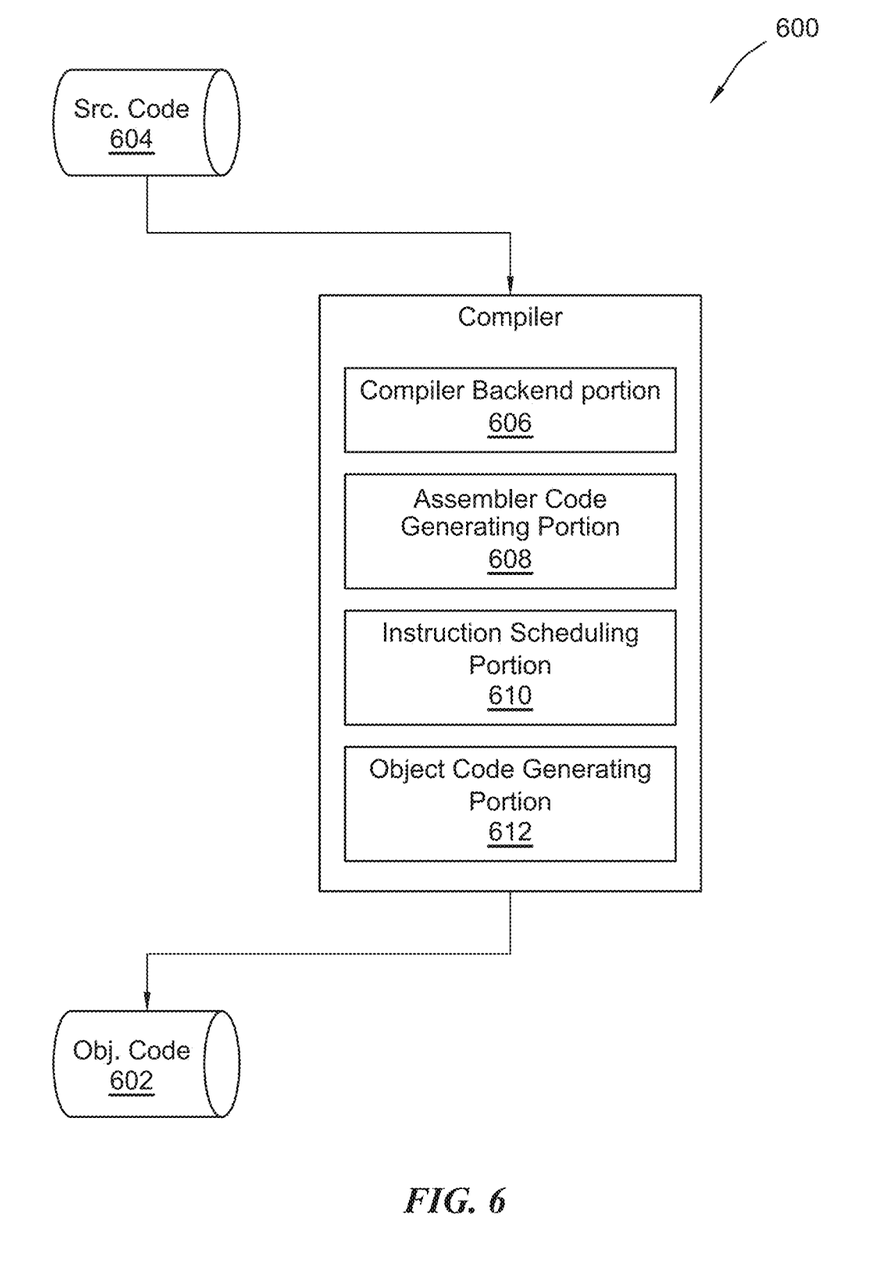
FIG. 6 is a block diagram illustrating the configuration of a compiler according to an embodiment of the present invention and related data.

FIG. 6 is a block diagram illustrating the configuration of a compiler 600 according to an embodiment of the present invention and related data. In some embodiments, compiler 600 is a program processing device that generates object code 602 from source code 604 written in a high-level language, and it includes a compiler backend portion 606, an assembler code generating portion 608, an instruction scheduling portion 610, and an object code generating portion 612.

The compiler backend portion 606 may read in high-level language source code 604 that is saved in a given file format and performs syntax analysis and semantic analysis to generate internal format code. If necessary, it may optimize the internal format code such that the size and the execution time of the eventually generated executable code are shortened.

The assembler code generating portion 608 may generate assembler code from the internal format code that has been generated and optimized by the compiler backend portion 606.

The instruction scheduling portion 610 may analyze the assembler code that has been generated by the assembler code generating portion 608 with regard to exclusivity between the conditions associated with the instructions, may analyze the code with regard to dependencies among the instructions, may rearrange the instructions (changes the order of the instructions via the card solver algorithm), and may add parallel execution boundaries, parallelizing the assembler code for the target processor (e.g., a CPU or GPU).

Figure 7:
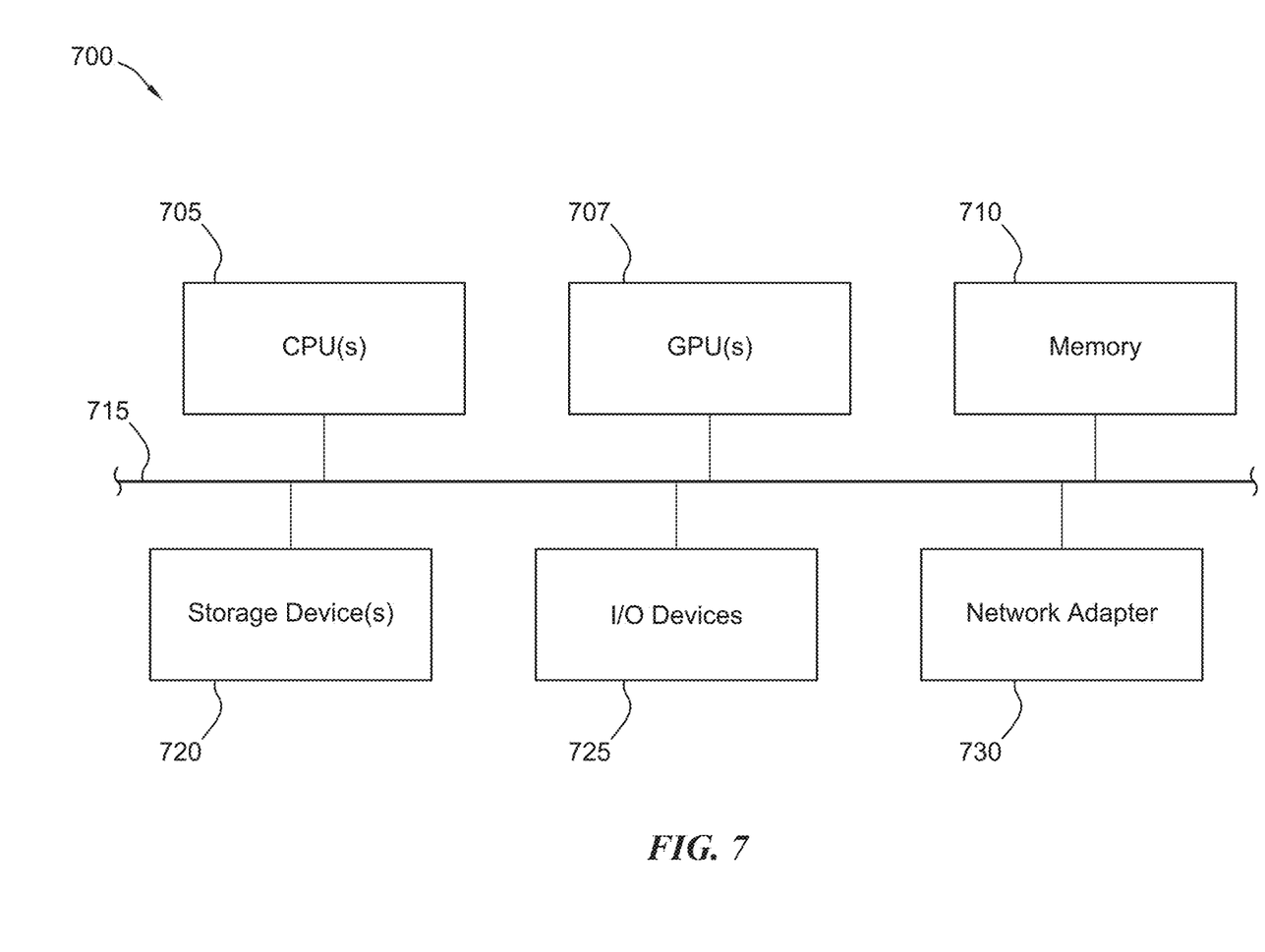
FIG. 7 is a block diagram of an exemplary computing system.

FIG. 7 is a block diagram of a computer system as may be used to implement features of some embodiments of the disclosed technology. The computing system 700 may be used to implement any of the entities, components, or services depicted in the examples of FIGS. 1-6 (and any other components described in this specification). The computing system 700 may include one or more central processing units ("processors" or "CPUs") 705, one or more graphics processing units ("GPUs") 707, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point-to-point connections, or both, connected by appropriate bridges, adapters, or controllers. The interconnect 715, therefore, may include, for example, a system bus, a Peripheral Component Interconnect (PCI) bus or PCI-Express (PCI-e) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 705 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and accompanying drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, and no special significance is to be placed upon whether a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to the various embodiments given in this specification.

Those skilled in the art will appreciate that the logic illustrated in each of the flow diagrams discussed above may be altered in various ways. For example, the order of the logic may be rearranged, sub-steps may be performed in parallel, illustrated logic may be omitted; other logic may be included, etc.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The present techniques will be better understood with reference to the following enumerated embodiments:

1. A method, comprising: receiving an input including a sequence of tokens; generating a set of token representations each representing one token from the sequence and including a precedence value assigned to that token; evaluating each token representation in the set of token representations in accordance with a defined order of operations; and generating an output to be inserted into a tree-data structure based on detecting a completion of operations, wherein the output comprises each token representation from the set of token representations in an order of capture.
2. The method of embodiment 1, wherein the defined order of operations comprises a rule specifying that a token representation having a greater precedence value captures a token representation having a lesser precedence value.
3. The method of any one of embodiments 1-2, wherein each token representation in the set of token representations is evaluated sequentially.
4. The method of any one of embodiments 1-3, wherein the input represents a formula comprising one or more variables and one or more operators.
5. The method of embodiment 4, wherein the formula includes a first variable followed by an operator followed by a second variable.
6. The method of embodiment 5, wherein the sequence of tokens includes a first token representing the first variable, a second token representing the operator, and a third token representing the second variable.
7. The method of any one of embodiments 1-6, wherein a token is assigned a precedence value based on a type of character represented by the token.
8. The method of any one of embodiments 1-7, further comprising: retrieving a table storing precedence values and corresponding types of character.
9. The method of embodiment 8, further comprising: determining a type of character represented by each token from the sequence of tokens; and for each token in the sequence of tokens: identifying, from the table, a precedence value corresponding to the determined type of character, and assigning the identified precedence value to the token to obtain a corresponding token representation of the token.
10. The method of any one of embodiments 1-9, wherein evaluating each token representation in the set of token representations comprises: identifying a first token representation representing a first token from the sequence of tokens; posting the first token representation to an evaluation board; identifying a second token representation representing a second token from the sequence of tokens sequentially following the first token; posting the second token representation to the evaluation board; and comparing the first token representation and the second token representation to determine whether the second token representation captures the first token representation.
11. The method of embodiment 10, wherein posting the second token representation to the evaluation board comprises stacking the first token representation on the second token representation.
12. The method of any one of embodiments 10-11, wherein comparing the first token representation and the second token representation comprises: determining a first precedence value associated with the first token representation and a second precedence value associated with the second token representation; and determining whether the second precedence value is greater than, equal to, or less than the first precedence value.
13. The method of embodiment 12, wherein the second precedence value is greater than the first precedence value, the method further comprises: removing the first token representation from the evaluation board; placing the first token representation in a first position in the output; and maintaining the second token representation on the evaluation board.
14. The method of embodiment 13, wherein detecting the completion of the operations comprises: determining that the set of token representations does not include any additional token representations, the method further comprises: placing the second token representation in a second position in the output.
15. The method of any one of embodiments 13-14, further comprising: determining that the set of token representations includes a third token representation representing a third token from the sequence of tokens sequentially following the second token; posting the third token representation to the evaluation board; and comparing the second token representation and the third token representation to determine whether the third token representation captures the second token representation.
16. The method of any one of embodiments 12-15, wherein the second precedence value is equal to the first precedence value, the method further comprises: identifying a third token representation representing a third token sequentially following the second token; posting the third token representation to the evaluation board; and comparing the third token representation to the second token representation to determine whether the third token representation captures the second token representation and the third token representation.
17. The method of any one of embodiments 12-16, wherein the second precedence value is less than the first precedence value, the method further comprises: identifying a third token representation representing a third token sequentially following the second token; posting the third token representation to the evaluation board; and comparing the third token representation to the second token representation to determine whether the third token representation captures the second token representation or whether the third token representation captures the second token representation and the first token representation.
18. The method of any one of embodiments 1-17, wherein the tree-data structure including the output is processed using a bottom-up parsing procedure to produce a result.
19. The method of embodiment 18, wherein the input comprises a formula, the result comprises a solution to the formula.
20. The method of any one of embodiments 1-19, wherein the sequence of tokens include one or more special characters.
21. The method of embodiment 20, wherein the special characters comprise a parenthetical.
22. The method of embodiment 21, wherein the parenthetical includes an additional sequence of tokens representing characters describing a formula.

23. The method of embodiment 22, wherein the input represents an additional formula, a result of the formula described by the additional sequence of tokens included within the parenthetical is used as a token in the sequence of tokens being evaluated.
24. The method of embodiment 23, wherein the token representing the result of the formula replaces the parenthetical in the sequence of tokens.
25. The method of any one of embodiments 23-24, further comprising: generating an additional set of token representations representing one token from the additional sequence of tokens and including a precedence value assigned to that token; and evaluating each token representation in the additional set of token representations in accordance with the defined order of operations to obtain the result, wherein the token representing the parenthetical is replaced with a token representing the result.
26. The method of embodiment 25, wherein the evaluation of each token representation in the additional set of token representations is performed in parallel with the evaluation of each token representation in the set of token representations.
27. The method of any one of embodiments 1-26, wherein the evaluation board comprises one or more data structures configured to store data representing the set of token representations.
28. The method of embodiment 27, wherein the one or more data structures include at least one of: an array, a stack, a list, a linked-list, a graph, or a tree.
29. The method of any one of embodiments 1-28, wherein the precedence value indicates an order to be used to process the input.
30. The method of any one of embodiments 1-29, wherein each token representation of the set of token representations stores a position of that token representation with respect to the input.
31. The method of any one of embodiments 1-30, further comprising: building the tree-data structure based on the output.
32. The method of embodiment 31, further comprising: for each token of the sequence of tokens: labeling the token with a corresponding node of a set of nodes; and storing a reference to any tokens captured by the token, wherein the tree-data structure is built based on the set of nodes and each reference.
33. The method of embodiment 32, further comprising: identifying a last node of the set of nodes corresponding to a last captured token representation of the set of token representations; forming a root node of the tree-data structure using the last node; determining one or more nodes from the set of nodes representing token representations captured by the last captured token representation; and forming one or more leaf nodes of the tree-data structure corresponding to the one or more determined nodes.
34. The method of embodiment 33, further comprising: identifying a processor assigned to process the tree-data structure; and processing, using the identified processor, the tree-data structure to obtain the result.
35. The method of any one of embodiments 1-34, wherein: the tree-data structure is a hybrid tree-data structure; and one or more nodes of the hybrid tree-data structure correspond to at least one of SIMD or linear operations.
36. The method of embodiment 35, wherein the one or more nodes include at least one node processed by a first processing architecture and at least one node processed by a second processing architecture.
37. The method of embodiment 36, wherein the first processing architecture is a GPU-type architecture and the second processing architecture is a CPU-type architecture.
38. The method of embodiment 37, wherein at least some of the nodes performing SIMD operations are directed the GPU-type architecture, and at least some of the nodes performing linear operations are directed to the CPU-type architecture.
39. The method of any one of embodiments 1-38, wherein the input comprises assembler code generated by a compiler, wherein the assembler code is analyzed with respect to exclusivity between conditions associated with the input and dependencies among the input.
40. The method of embodiment 39, wherein the assembler code is generated based on internal format code of the compiler, and the internal format code is generated based on high-level language source code.
41. The method of embodiment 40, wherein the compiler is configured to read the high-level language source code and perform syntax analysis and semantic analysis to generate the internal format code.
42. The method of any one of embodiments 40-41, wherein the compiler is configured to optimize the internal format code such that (i) a size of executable code generated based on the internal format code is shortened and (ii) an execution time for executing the executable code is shortened.
43. The method of any one of embodiments 1-42, wherein the input is received at a compiler system, the set of token representations are generated by the compiler system; each token representation is evaluated by the compiler system, and the output is generated by the compiler system.
44. A system, comprising: one or more processors programmed to perform the method of any one of embodiments 1-43.
45. A non-transitory computer-readable medium storing computer program instructions that, when executed by one or more processors, effectuate the method of any one of embodiments 1-43.

What is claimed is:
1. A computer-implemented method, comprising:
receiving, at a compiler system, an input including a sequence of tokens;
generating, by the compiler system, a set of token representations each representing one token from the sequence and including a precedence value assigned to that token;
evaluating, by the compiler system, each token representation in the set of token representations in accordance with a defined order of operations, wherein evaluating comprises:
identifying a first token representation representing a first token from the sequence of tokens;
posting the first token representation to an evaluation board;
identifying a second token representation representing a second token from the sequence of tokens sequentially following the first token;
posting the second token representation to the evaluation board; and comparing the first token representation and the second token representation to determine whether the second token representation captures the first token representation; and generating, by the compiler system, an output to be inserted into a tree-data structure based on detecting a completion of operations, wherein the output comprises each token representation from the set of token representations in an order of capture.

2. The method of claim 1, wherein the defined order of operations comprises a rule specifying that a token representation having a greater precedence value captures a token representation having a lesser precedence value.

3. The method of claim 1, wherein each token representation in the set of token representations is evaluated sequentially.

4. The method of claim 1, further comprising:
retrieving a table storing precedence values and corresponding types of characters.

5. The method of claim 4, further comprising:
determining a type of character represented by each token from the sequence of tokens; and
for each token in the sequence of tokens:
identifying, from the table, a precedence value corresponding to the determined type of character, and
assigning the identified precedence value to the token to obtain a corresponding token representation of the token.

6. The method of claim 1, wherein comparing the first token representation and the second token representation comprises:
determining a first precedence value associated with the first token representation and a second precedence value associated with the second token representation; and
determining whether the second precedence value is greater than, equal to, or less than the first precedence value.

7. The method of claim 6, wherein the second precedence value is greater than the first precedence value, the method further comprises:
removing the first token representation from the evaluation board;
placing the first token representation in a first position in the output; and
maintaining the second token representation on the evaluation board.

8. The method of claim 7, wherein detecting the completion of the operations comprises:
determining that the set of token representations does not include any additional token representations, the method further comprises:
placing the second token representation in a second position in the output.

9. The method of claim 7, further comprising:
determining that the set of token representations includes a third token representation representing a third token from the sequence of tokens sequentially following the second token;
posting the third token representation to the evaluation board; and
comparing the second token representation and the third token representation to determine whether the third token representation captures the second token representation.

10. The method of claim 6, wherein the second precedence value is equal to the first precedence value, the method further comprises:
identifying a third token representation representing a third token sequentially following the second token;
posting the third token representation to the evaluation board; and
comparing the third token representation to the second token representation to determine whether the third token representation captures the second token representation and the third token representation.

11. The method of claim 6, wherein the second precedence value is less than the first precedence value, the method further comprises:
identifying a third token representation representing a third token sequentially following the second token;
posting the third token representation to the evaluation board; and
comparing the third token representation to the second token representation to determine whether the third token representation captures the second token representation or whether the third token representation captures the second token representation and the first token representation.

12. The method of claim 1, wherein the sequence of tokens include one or more special characters.

13. The method of claim 12, wherein the special characters comprise a parenthetical.

14. The method of claim 13, wherein the parenthetical includes an additional sequence of tokens representing characters describing a formula.

15. The method of claim 14, wherein the input represents an additional formula, a result of the formula described by the additional sequence of tokens included within the parenthetical is used as a token in the sequence of tokens being evaluated.

16. The method of claim 14, wherein a token representing a result of the formula replaces the parenthetical in the sequence of tokens.

17. The method of claim 14, wherein the input represents an additional formula, the method further comprises:
generating an additional set of token representations representing one token from the additional sequence of tokens and including a precedence value assigned to that token; and
evaluating each token representation in the additional set of token representations in accordance with the defined order of operations to obtain the result, wherein the token representing the parenthetical is replaced with a token representing the result.

18. A system, comprising:
one or more processors programmed to:
receive an input including a sequence of tokens;
generate a set of token representations each representing one token from the sequence and including a precedence value assigned to that token;
evaluate each token representation in the set of token representations in accordance with a defined order of operations, wherein each token representation being evaluated comprises the one or more processors being programmed to:
identify a first token representation representing a first token from the sequence of tokens;
post the first token representation to an evaluation board;

identify a second token representation representing a second token from the sequence of tokens sequentially following the first token;

post the second token representation to the evaluation board; and compare the first token representation and the second token representation to determine whether the second token representation captures the first token representation; and generate an output to be inserted into a tree-data structure based on detecting a completion of operations, wherein the output comprises each token representation from the set of token representations in an order of capture.

19. A non-transitory computer-readable medium storing computer program instructions that, when executed by one or more processors, effectuate operations comprising:

receiving, at a compiler system, an input including a sequence of tokens;

generating, by the compiler system, a set of token representations each representing one token from the sequence and including a precedence value assigned to that token;

evaluating, by the compiler system, each token representation in the set of token representations in accordance with a defined order of operations, wherein evaluating comprises:

identifying a first token representation representing a first token from the sequence of tokens;

posting the first token representation to an evaluation board;

identifying a second token representation representing a second token from the sequence of tokens sequentially following the first token;

posting the second token representation to the evaluation board; and comparing the first token representation and the second token representation to determine whether the second token representation captures the first token representation; and generating, by the compiler system, an output to be inserted into a tree-data structure based on detecting a completion of operations, wherein the output comprises each token representation from the set of token representations in an order of capture.

* * * * *